Oct. 25, 1966 J. R. IBLINGS ET AL 3,280,992

RETAINING AND REPLACEMENT MEANS FOR DATA STORAGE ELEMENTS

Filed Nov. 2, 1964 4 Sheets-Sheet 1

INVENTORS
JACKSON R. IBLINGS
CHARLES T. INATOMI
RICHARD H. PRICE

BY Louis A. Kline
John J. Marlago
Dominick Nardelli
THEIR ATTORNEYS

RETAINING AND REPLACEMENT MEANS FOR DATA STORAGE ELEMENTS

Filed Nov. 2, 1964 4 Sheets-Sheet 2

INVENTORS
JACKSON R. IBLINGS
CHARLES T. INATOMI
RICHARD H. PRICE

BY Louis A. Kline
John J. Matlago
Dominick Nardelli
THEIR ATTORNEYS

RETAINING AND REPLACEMENT MEANS FOR DATA STORAGE ELEMENTS

Filed Nov. 2, 1964 4 Sheets-Sheet 3

INVENTORS
JACKSON R. IBLINGS
CHARLES T. INATOMI
RICHARD H. PRICE
BY Louis A. Kline
John J. Maclago
Dominick Nardelli
THEIR ATTORNEYS

RETAINING AND REPLACEMENT MEANS FOR DATA STORAGE ELEMENTS

Filed Nov. 2, 1964 4 Sheets-Sheet 4

INVENTORS
JACKSON R. IBLINGS
CHARLES T INATOMI
RICHARD H. PRICE

BY Louis A Kline
John J. Matlago
Dominick Nardelli
THEIR ATTORNEYS

United States Patent Office 3,280,992
Patented Oct. 25, 1966

3,280,992
RETAINING AND REPLACEMENT MEANS FOR DATA STORAGE ELEMENTS

Jackson R. Iblings, Hollywood, Charles T. Inatomi, Culver City, and Richard H. Price, La Canada, Calif., assignors to The National Cash Register Company, Dayton, Ohio, a corporation of Maryland Filed Nov. 2, 1964, Ser. No. 408,013
8 Claims. (Cl. 214—1)

This invention relates generally to data-storage apparatus, and to means for storing, inserting, removing and/or replacing the data-storage elements used therewith. More particularly, the invention relates to improved means for interchanging sets of data-storage elements of the type employed with random access storage devices, such as disclosed in the commonly assigned copending application, Serial No. 12,032, filed March 1, 1960.

The advantages to be derived from a high capacity, rapidly accessible random access storage device for use in a computer system are so numerous and well recognized as to require little elaboration. However, one of the more difficult problems which has been encountered in such random access data-storage devices resides in the difficulty in providing for the rapid interchangeability of th data-storage elements employed therewith, since, by their very nature, random access devices are inherently constructed and arranged in a manner which does not facilitate interchangeability between data-storage elements. As a result, in many random access devices, it is necessary to provide sufficient built-in storage capacity for the maximum amount of data which might be required to be stored, thereby greatly increasing the size as well as the expense of the resultant device while still providing only a limited capacity.

A canister, for use with a random access device as disclosed in the previously mentioned copending application Serial No. 12,032, is disclosed in another commonly assigned copending application, Serial No. 209,121, filed July 11, 1962. That canister allows the operator to remove and replace a set of data-storage elements or strips employed with the random access device in about one-half minute. Although the canister allows the operator to accomplish the operation relatively fast, the canister is costly because it requires means for clamping the strips to maintain them in an aligned stack during the interchanging operation. Also, the random access device requires additional precision parts which cooperate with the canister to align the canister therewith while a set of strips is being removed from and replaced in the device.

In accordance with the present invention, an improved canister is provided which fully encloses and protects for storage a set of data storage strips. The canister also allows an operator of a random access device to interchange a set of data-storage strips in the data-storage device in about one-half minute or less. The canister includes indexing and reference surfaces which cooperate with appropriately shaped surfaces at the entrance of the magazine of the data-storage device to thereby properly position the canister to enable a set of storage strips to be readily interchanged between the canister and the magazine.

A broad object of the present invention is to provide an improved and simpler means for storing, inserting, removing and/or replacing a set of data-storage strips employed with a random access storage device.

A specific object of the present invention is to provide an improved canister which fully encloses a stack of data-storage strips to provide a dust-free container and which is able to retain and support the set of strips in such a manner that the strips can be moved relative to each other and still be maintained in alignment in the stack.

Another object is to provide a canister in accordance with any of the preceding objects, which canister can be very simply keyed or indexed in place relative to the random access storage device such that the strips are readily aligned with the random access storage device during the insertion or removal thereof.

Still another object of the invention is to provide a canister for storing data-storage strips having a construction and arrangement which allows the canister to engage a random access device and align the strips therewith without the need of additional structure on the device.

Other objects, advantages and features of the present invention will become apparent from consideration of the following description when taken in conjunction with the appended claims and the drawings wherein:

Figures 1, 2:
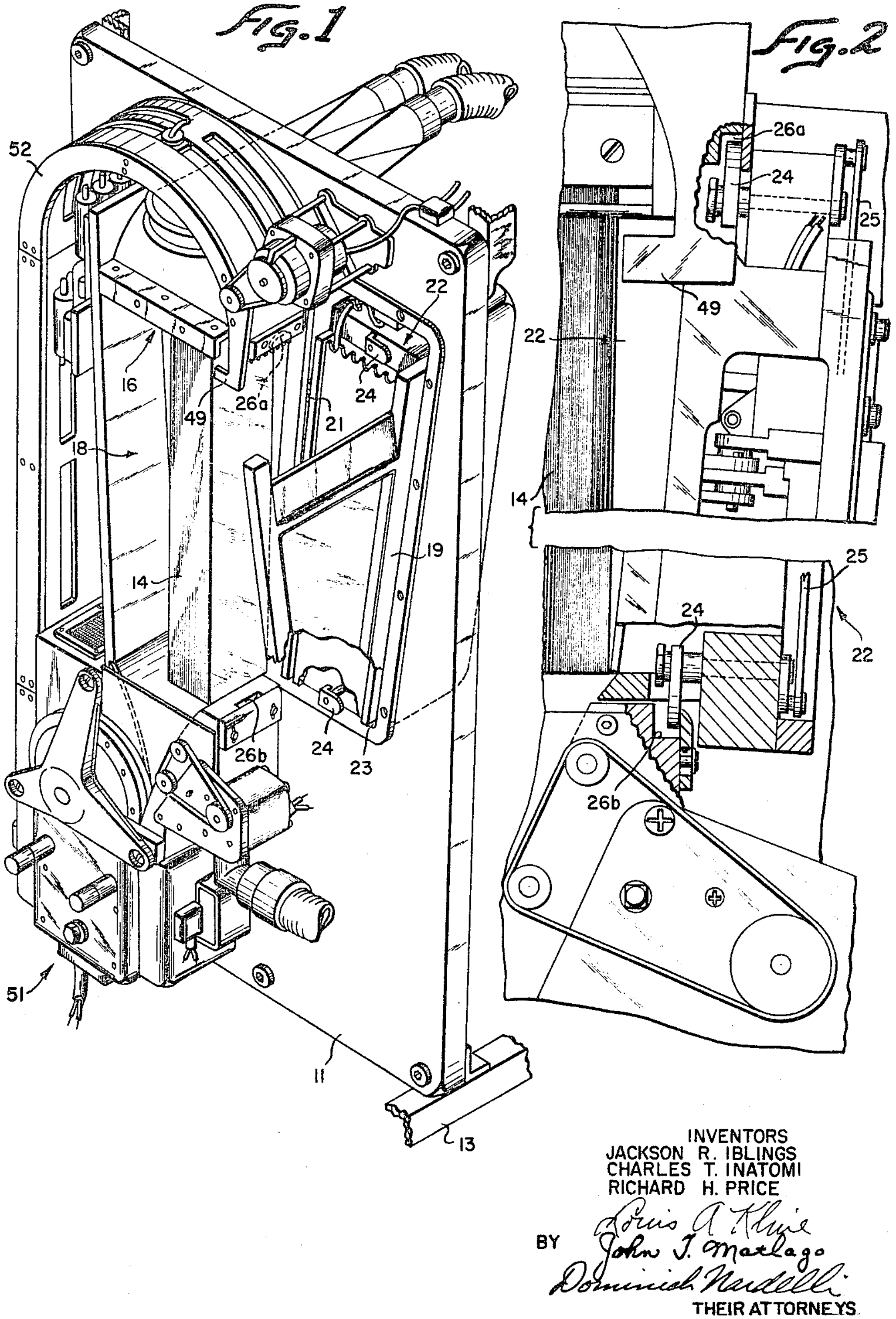
FIG. 1 is a pictorial view of a typical random access storage device with the door of the magazine in the open position, exposing the data-storage strips therein.
FIG. 2 is an enlarged view of the right hand portion of the magazine as viewed in FIG. 1 with the door in the closed position with portions broken away to show the locking means for the door.

Before proceeding with a detailed description of the present invention, a brief description of the basic random access storage device, as disclosed in the aforementioned copending patent application Serial No. 12,032, will follow in order to provide a background for the description of the present invention. Referring to FIG. 1, there is shown a pictorial representation of the basic random access storage device. The device includes a number of mechanical components that are mounted on an upright plate 11 that is suitably mounted on a frame 13 (partially shown). The frame 13 is part of an enclosed console (not shown) that may also enclose suitable circuitry for controlling the system.

Figure 3:
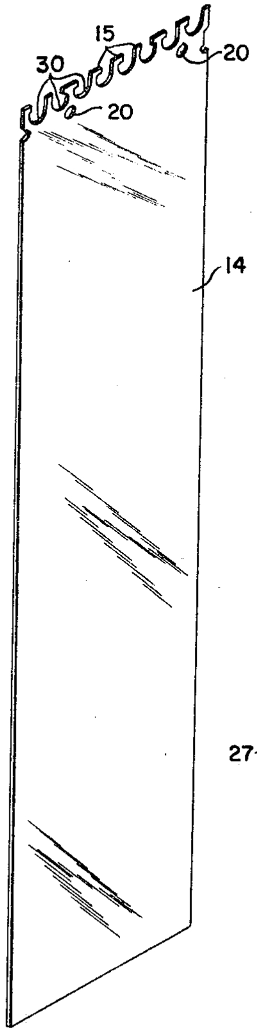
FIG. 3 is a pictorial view of a typical data-storage strip which may be employed with the device shown in FIG. 1.
Figure 4:
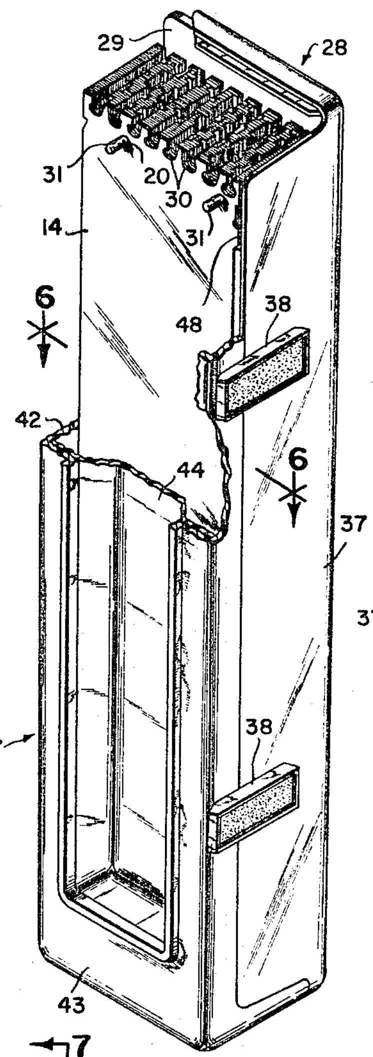
FIG. 4 is a front pictorial view of a canister having a portion of the cover broken away showing a set of the data-storage strips stored therein.
Figure 5:
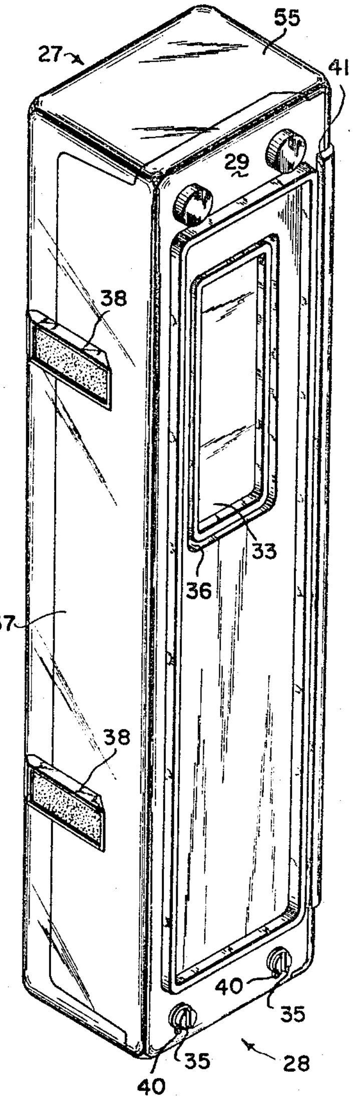
FIG. 5 is a rear pictorial view of the canister shown in FIG. 4.

Information is magnetically recorded on a set of storage strips 14. (A typical strip 14 is shown in FIG. 3.) Each strip 14 is thin, flat and flexible and has tabs 15 formed at the upper edge which tabs 15 form a plurality of coded notches 30 therebetween. The strip is disposed to depend lengthwise by the tabs 15 from suspender means 16 (FIG. 1) that is fixed to the plate 11. However, unlike the strips in the above-mentioned application, these strips 14 (FIG. 3) also have two spaced holes 20 disposed just below the tabs 15 for reasons that will be hereinafter explained. The suspender means 16 (FIG. 1) includes a plurality of horizontally disposed selector rods 17 (shown more clearly in FIG. 9) which pass through the coded notches 30 so that the strips can be selectively released by rotating certain ones of the selector rods 17 in a manner as disclosed in the above-mentioned applications, Serial Nos. 12,032 and 209,121. During the normal operation of the device and after a strip is selectively released, a transducing operation is performed on the strip by a transducer means 51. Then, the strip is returned to the right side of the suspender means 16 by a guide means 52, and reloaded back onto the rods by a loading means 22 (FIG. 2). A shroud 49 in conjunction with the loading means 22 aids in reloading a strip returning from the guide means 52 back onto the rods 17 of the suspender means 16.

While the random-access device is in normal operation, the strips 14 are enclosed within a magazine 18 (FIG. 1) by a door 19 which also houses the loading means 22. When the door 19 is closed, the loading means 22 is disposed on the right side of the magazine as shown in FIG. 2. The door 19 can be opened after two keys 24 on the door are rotated out of upper and lower keyways **26*a* and 26*b* by suitable linkage means 25. FIG. 2 shows the keys 24 on the door engaging keyways 26*a* and 26*b* when the door 19 is in the closed position. The door 19 pivots on suitable hinges 21 (FIG. 1) that are so positioned to cause the portion of the door housing the loading means 22 to nest within a well 23 formed in the plate 11**.

Figure 9:
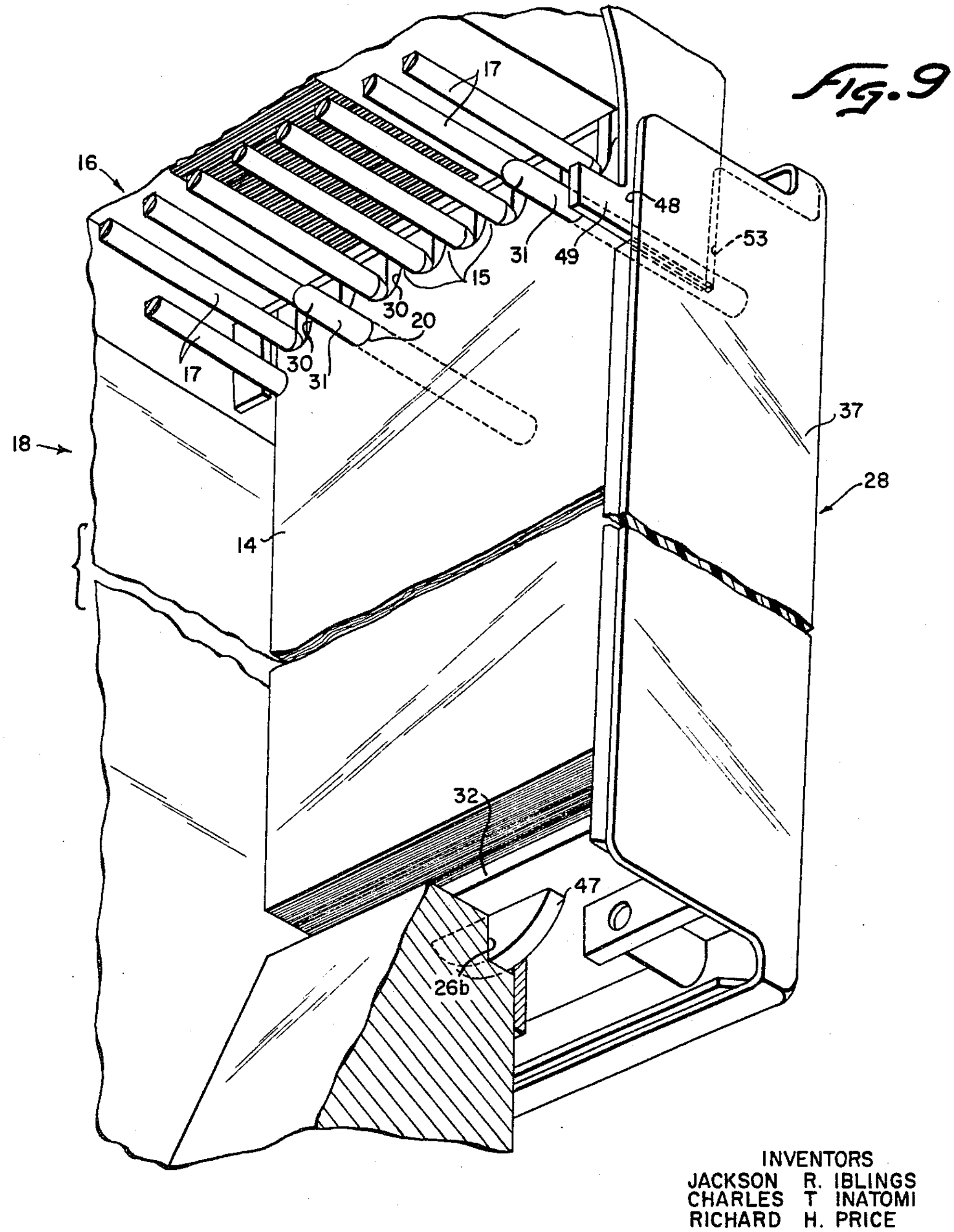
FIG. 9 is a pictorial internal view of the magazine for the random access device showing the storage or base section of the canister indexed to and in alignment with the magazine, ready to insert a set of strips therein.

When the door 19 is in the open position, as shown in FIG. 1, the ends of the selector rods 17 are exposed, as shown in FIG. 9. Therefore, a set of strips 14 can be loaded onto the rods 17 by passing the ends of the rods 17 through the respective coded notches 30 formed between the tabs 15. In the reverse manner, the set of strips 14 can be removed from the magazine by sliding the strips 14 off the ends of the rods 17. It should be clear that it is highly desirable to store the set of strips upon being removed from the rods 17 so as to maintain the alignment of the tabs on the strips such that the set of strips can again be readily placed back into the magazine.

Figure 6:
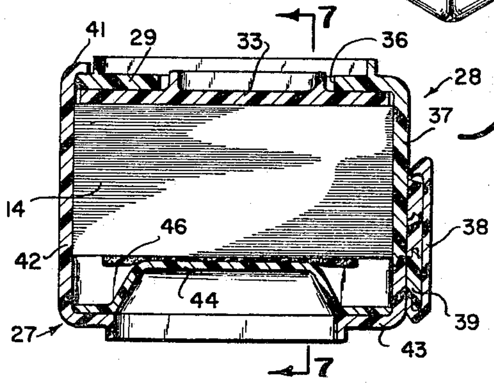
FIG. 6 is a transverse section of the canister taken on line 6—6 in FIG. 4.
Figures 7, 8:
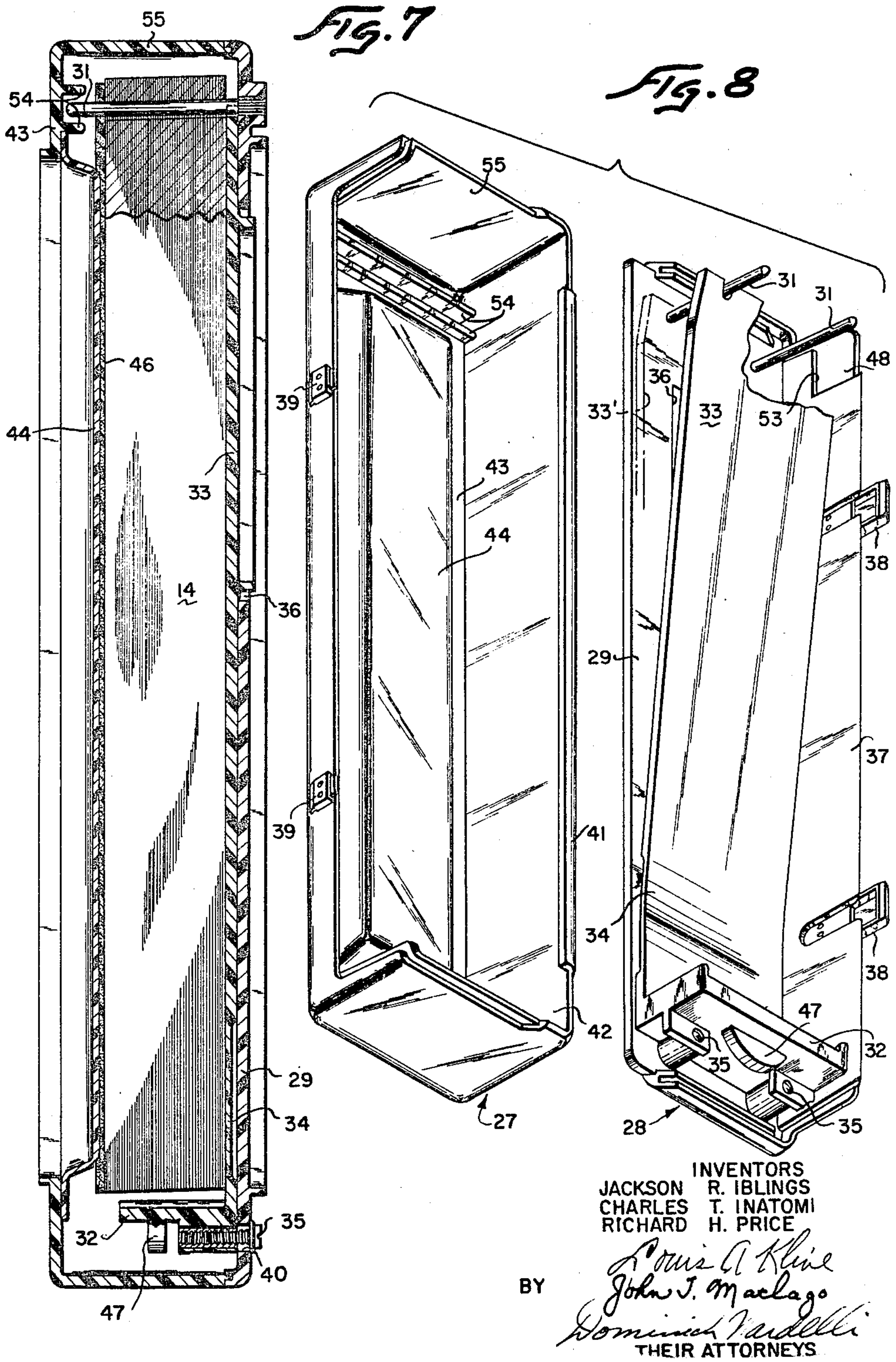
FIG. 7 is a longitudinal section of the canister taken on line 7—7 in FIG. 6.
FIG. 8 is a pictorial view of an empty canister showing the interior of the two sections thereof.

Referring to FIGS. 4 through 8, there is shown an embodiment of an improved canister, which facilitates the insertion and removal of a set of strips 14 into and out of the magazine 18 and provides a closed, dust-free storage container for the set of strips 14. The canister is made up of two sections, a cover 27 and a loader 28, shown separated in FIG. 8 and made of, for example, plastic. The loader 28 has a back wall 29 with two dowels 31 made of, for example, metal secured to the wall so as to protrude therefrom. The function of the dowels 31 is to engage the holes 20 (mentioned above) in the strips 14 and to hold the strips in a stack with the notches 30 on each strip aligned with corresponding notches on the other strips in the manner shown in FIG. 4. The relative clearance between the holes 20 and the dowels 31 is small, for example, no more than .005 of an inch. The length of the dowels 31 is made longer than the thickness of the set or stack of strips for reasons that will become apparent hereinafter. At the lower end of the back wall 29, there is disposed a base 32 (FIG. 8) made of, for example, plastic. The base 32 is not made integral with the back wall 29 but is preferably bolted thereto by bolts 35. Bolts 35 pass through elongated opening 40 (FIG. 7) formed in back wall 29 for reasons that will be explained hereinafter. When the set of strips 14 are engaged by the dowels 31, the strips lie flat against a pusher plate 33 as shown in FIG. 7. The pusher plate 33 whose main portion is relatively rigid includes a flexible lower portion 34 (FIG. 8) which integrally attaches the pusher plate 33 to the base 32. The flexible portion 34 allows the pusher plate 33 to flex as shown in FIG. 8 when force is manually exerted thereon through an opening 36, formed in the upper half of back wall 29. (The long and short dash lines 33′ in FIG. 8 indicate the position of the pusher plate 33 against the back wall 29.) As will be explained hereinafter, the function of the pusher plate 33 is to readily allow the strips 14 to be pushed off the dowels 31, and onto the selector rods 17.

The loader 28 has a side wall 37 that is disposed perpendicular to an integral with the back wall 29 and serves as part of the envelope that encloses the set of strips 14 when the cover 27 is assembled onto the loader 28. Suitable latches 38 on the side wall 37 engage lugs 39 on the cover 27 (in a manner as shown in FIG. 6) to hold one side of the canister closed, while the other side of the canister is held closed by a flange 41 formed along side wall 42 of the cover. The flange 41 engages the back wall 29 on the loader 28. The flange 41, besides aiding the latches 38 to lock and hold the cover 27 to the loader 28, allows a means for separating the two when required. The cover 27 has a front wall 43 that is disposed perpendicular to side wall 42 to extend over the set of strips when the canister is closed. The front wall 43 has two inwardly protruding flanges 54 (FIG. 7) that are disposed on opposite sides of the dowels 31 when the canister is closed. Since the set of strips 14 is spaced from the base 32 and the top wall 55 of the cover, the flanges 54 provide longitudinal support for the dowels 31 when the canister is being handled. Additional structure for transverse support for the dowels is not needed since the set of strips 14 are retained between side walls 37 and 42 (see FIG. 6). Since the dowels 31 extend beyond the set of strips 14, the front wall 43 includes an inwardly protruding center section 44, which is preferably made of clear plastic to allow visual inspection of the interior of the canister. The center section 44 also serves to limit the movement of the strips within a closed canister in the third direction that is mutually perpendicular to the longitudinal and transverse direction. Since the thickness of a stack of one set of strips may vary from the thickness of another stack of strips, a resilient, foam pad 46 (FIG. 6) made of, for example, rubber, may be placed between the section 44 and the set of strips 14 when the strips and canister are to receive relatively rough treatment, for example, during shipment. The pad 46 prevents the surfaces of the strips from sliding across each other and thereby prevents scratches from being formed in the magnetic material.

Now that the preferred embodiment of the improved canister has been described, the following description describes how the canister cooperates with the random access device shown in FIGS. 1 and 2 so as to facilitate insertion and removal of a set of strips 14. Referring to FIG. 9, when the set of strips are to be loaded into the magazine 18 and onto the selector rods 17 of the suspender means 16, the cover 27 is removed from the loader 28 after unlatching the latches 38. The set of strips are thus exposed and the dowels 31 hold the set of strips 14 in a stack, with the coded notches 30 on one strip aligned with the respective coded notches on another strip. After the door 19 of the magazine is in open position, as shown in FIG. 1, the loader 28 is placed against the magazine 18 as shown in FIG. 9. An indexing member 47, provided on the underside of base 32, is first placed within the keyway **26*b* in the bottom of the magazine 18 to align the bottom of the loader 28 with the magazine. The member 47 has a semi-circular shape which matches the keyway 26*b*. The loader 28 is pivoted about the member 47 until the two surfaces 48 and 53 on the side wall 37 engage the shroud 49. With the loader 28 in this position, the selector rods 17 are aligned with the respective coded notches 30 formed between the various tabs 15 on the strips, and the dowels 31 extend under the selector rods 17 and parallel thereto. Then, by manually pushing on the pusher pate 33 through the opening 36 formed in the back wall 29, the strips 14 are made to slide first onto the selector rods 17 and then off the dowels 31. It is for this reason that the dowels are made longer than the thickness of the set of strips. The pusher plate 33 being rigid, facilitates the operation of sliding the flexible strips onto the rods 17. It is thus obvious that the spacing between the underside of the base 32 and the dowels 31 is critical since this determines the proper alignment of the selector rods 17 with respect to the coded notches 30. Therefore, the function of the elongated openings 40 for the bolts 35** is to provide a means for adjusting this spacing.

After the strips are loaded, the loader 28 is lifted away, the door 19 is closed, and the random access device is ready for use. To remove the strips from the magazine, the door is again opened, and then the loader 28, without a set of strips, is placed against the magazine, with the indexing member 47 engaging the lower keyway **26*b* in the magazine and with the surfaces 48 and 53 on the side wall 37 of the loader 28 engaging the shroud 49. The dowels 31 are now in alignment with the holes 20 in the strips. With the right hand holding the loader in place, the left hand can readily slide the strips to the right of the magazine, off the selector rods and onto the dowels 31. It should be noted as shown in FIG. 3, that the holes 20** in each strip are not symmetrically positioned relative to the sides of the strip to ensure that the strips are loaded only one way into the magazine.

With the present disclosure in view, modifications of the invention would become apparent to those skilled in the art. Accordingly, the invention is not limited to the details of the illustrated preferred embodiment but includes all such modifications and variations coming within the scope of the invention as defined by the appended claims.

What is claimed is:

1. In combination: a random access data-storage device including a magazine for retaining a plurality of data-storage elements for use with said device, and a canister means for retaining said data-storage elements when apart from said device, said canister means also serving to facilitate insertion of said elements into said magazine as well as removal therefrom, said magazine having at least one fixed reference surface for positioning said canister means relative to said magazine, said canister means including indexing means for cooperating with said reference surfaces while said canister means is positioned relative to said magazine for inserting said elements into said magazine, as well as removal therefrom, and retaining means for retaining said elements in alignment as said elements are inserted into or removed from said device.

2. In combination: a random access data-storage device including a magazine for retaining a plurality of data-storage strips for use with said device; and a canister means for retaining said data-storage strips when apart from said device, and serving to facilitate insertion of said strips into said magazine as well as removal therefrom; said device including a door to provide access to said magazine and said door having a lug for engaging a keyway on said magazine for locking said door closed against said magazine, said canister including a loader section for supporting said strips in a stack; means fixed to said loader section for retaining said strips in alignment while said stack of strips is being loaded into said device; means on said loader section for pushing said stack of strips away from said loader; and an indexing member on said loader section for engaging said keyway on said magazine for positioning said loader section with said magazine for inserting said stack of strips into said magazine or for removing said stack of strips therefrom.

3. A canister for retaining a plurality of data-storage strips each having at least two holes to be employed for aligning the strips into a stack, said canister comprising: a member for supporting said strips; at least two dowels protruding from said member and fixed thereto; said dowels being adapted to extend through said holes when said strips are retained within said canister; means on said member for pushing said strips away from said member while said strips are on said dowels; and a cover cooperating with said member for providing an enclosure for said strips, the center portion of said cover extending inwardly to hold the strips against said member.

4. A canister for retaining a plurality of data-storage strips each having at least two holes to be employed for aligning the strips into a stack, said canister comprising: a member for supporting said strips and having an opening through which said strips can be pushed away from said member; a panel disposed over said opening in said member and fixed at one end to said member so that said panel flexes and bends away from said member when force is exerted on said panel through said opening; at least two dowels protruding from said member and fixed on the same side of the member as the panel; said dowels being adapted to extend through said holes so that said strips are able to lie in a stack flat against said panel when said strips are retained within said canister; and a cover cooperating with said member for providing an enclosure for said strips, the center portion of said cover extending inwardly to hold the strips against said panel.

5. In combination: a random access data-storage device including a magazine for retaining a plurality of data-storage strips for use with said device; and canister means for retaining said data-storage strips when apart from said device, and serving to facilitate insertion of said strips into said magazine as well as removal therefrom; said magazine having a hinged door for access into said magazine and locking means for securing said door in a closed position with respect to said magazine; said canister means including a loader section for supporting said strips in a stack; means fixed to said loader section for retaining said strips in alignment while said stack of strips is being loaded into said device; said loader section having an opening whereby said strips can be pushed away from said loader section when force is exerted through said opening; and indexing means for engaging a portion of said locking means to align said loader section with said magazine for loading said stack of strips into said magazine as well as for removing said stack of strips therefrom.

6. In combination: a random access data-storage device including: a plurality of data-storage strips each having notches and each strip having at least two spaced holes to be employed for aligning the strips, a magazine having a plurality of selector rods for retaining said data-storage strips by said notches; a door on said magazine for access thereto and for exposing one end of said selector rods; and locking means for securing said door to said magazine; and a canister means for retaining said strips when apart from said magazine and serving to facilitate insertion of said strips into said magazine, as well as removal therefrom, said canister means including: a loader section for supporting said strips in a stack and having an opening through which said stack of strips can be pushed away from said loader section; a panel disposed over said opening in said loader section and fixed at one end to said loader section so that said panel flexes and bends away from said loader section when force is exerted on said panel through said opening; at least two dowels protruding from said loader section and fixed to the same side of the loader section as said panel, said dowels being adapted to extend through said holes so that said stack of strips is able to lie flat against said panel when said strips are retained within said canister means; indexing means fixed to said loader section and engaging a portion of said locking means on said magazine when said door for said magazine is open to place said notches on said strips in alignment with said rods so that said stack of strips can be interchanged between said loader section and said magazine; and a cover cooperating with said loader section for providing an enclosure for said stack of strips, the center portion of said cover extending inwardly of the enclosure to hold the strips against said panel when said canister means is apart from said device.

7. In combination: a set of data-storage strips and a canister for retaining said set of strips, said strips including a plurality of tabs with coded notches disposed between the tabs, and including at least two holes to be employed for aligning the strips; said canister comprising: a member for supporting said strips; at least two dowels protruding from said member and fixed thereto; said dowels being adapted to pass through said holes in said strips to hold said strips in a stack, and said member having an opening whereby said strips can be pushed away therefrom when force is exerted through said opening.

8. In combination: a random access data-storage device including a magazine having a plurality of selector rods for retaining a plurality of data-storage strips by notches formed on said strips; a door on said magazine for access thereto and for exposing one end of said selector rods; locking means for securing said door to said magazine; a canister means for retaining said strips when apart from said magazine and for serving to facilitate insertion of said strips into said magazine, as well as removal therefrom, said canister means including means for retaining said strips in a stack while one end of the stack is exposed so that the strips can be readily removed from said canister means and loaded onto said rods, and said canister means also including indexing means for engaging a portion of said locking means on said magazine when said door for said magazine is open to place said notches in alignment with said rods so that said strips can be pushed out of said canister means onto said rods.

References Cited by the Examiner

UNITED STATES PATENTS

| | | | |
|---|---|---|---|
| 599,556 | 2/1898 | Flora | 95—41 X |
| 1,751,169 | 3/1930 | Parker | 221—197 X |
| 2,149,099 | 2/1939 | Phinney | 221—197 X |
| 2,493,868 | 1/1950 | Griffin. | |

MARVIN A. CHAMPION, *Primary Examiner.*